US006516495B1

(12) United States Patent
Michalak

(10) Patent No.: US 6,516,495 B1
(45) Date of Patent: Feb. 11, 2003

(54) DOOR ARRESTER WHICH IS JOINED TO A DOOR HINGE, FOR AUTOMOBILE DOORS

(75) Inventor: Markus Michalak, Langenfeld (DE)

(73) Assignee: Ed. Scharwaechter GmbH, Remscheid (DE)

( * ) Notice: Subject to any disclaimer, the term of this patent is extended or adjusted under 35 U.S.C. 154(b) by 0 days.

(21) Appl. No.: 09/856,119

(22) PCT Filed: Nov. 24, 1999

(86) PCT No.: PCT/DE99/03720

§ 371 (c)(1), (2), (4) Date: May 17, 2001

(87) PCT Pub. No.: WO00/31367

PCT Pub. Date: Jun. 2, 2000

(30) Foreign Application Priority Data

Nov. 26, 1998 (DE) ........................................ 198 54 602

(51) Int. Cl.[7] ............................ B60J 5/00; E05D 11/10

(52) U.S. Cl. ............................ 16/320; 16/321; 16/371; 16/DIG. 14; 296/146.11

(58) Field of Search .......................... 16/319, 320, 321, 16/374, DIG. 14, 334, 366, 371; 296/146.11

(56) References Cited

U.S. PATENT DOCUMENTS

| | | | | |
|---|---|---|---|---|
| 2,890,477 A | | 6/1959 | Miller | 16/140 |
| 5,346,272 A | | 9/1994 | Priest | 296/146.11 |
| 5,867,872 A | | 2/1999 | Katoh | 16/337 |
| 6,029,314 A | * | 2/2000 | Kluting et al. | 16/322 |
| 6,073,309 A | * | 6/2000 | Kluting et al. | 16/322 |
| 6,282,752 B1 | * | 9/2001 | Kluting et al. | 16/322 |
| 6,314,614 B1 | * | 11/2001 | Kuehl | 16/340 |
| 6,427,287 B1 | * | 8/2002 | Brueckner et al. | 16/342 |

FOREIGN PATENT DOCUMENTS

| | | |
|---|---|---|
| DE | 19619473 | 11/1997 |
| EP | 0648910 | 4/1995 |
| FR | 2352142 | 12/1977 |

OTHER PUBLICATIONS

Patent Abstracts of Japan, Application No. 09 303 032, published Jan. 25, 1997.

* cited by examiner

*Primary Examiner*—Gary S. Hartmann
(74) *Attorney, Agent, or Firm*—Davidson, Davidson & Kappel, LLC

(57) ABSTRACT

A door stop which is connected to a door hinge and is intended for motor-vehicle doors comprises a holding device, which is connected to the hinge half assigned to one of the two door assembly parts, the door or door pillar, and a braking device, which is connected to the hinge half assigned to the other door assembly part. In the door stop, on the one hand, the braking device has at least two braking and holding bodies (10), which are subjected to a spring load, and, on the other hand, the holding device has at least one latching ramp (28, 29) assigned to the braking and holding bodies. Furthermore, in the door stop the holding device which has at least one latching ramp (28, 29) is formed by an at least annular body (16), which is arranged concentrically with the braking-body carrier (9), and one of the two devices, the holding device or braking device, is driven in a rotating manner as a function of the door movement. It is proposed for the door stop, partly in order to improve its spatial design and partly in order to improve its effectiveness, that the braking device and the holding device are arranged in a parallel alignment, offset laterally with respect to the hinge axis (24), on the hinge half (1) in which the hinge pin (3), is mounted with a running fit.

13 Claims, 3 Drawing Sheets

DOOR ARRESTER WHICH IS JOINED TO A DOOR HINGE, FOR AUTOMOBILE DOORS

BACKGROUND OF THE INVENTION

The invention relates to a door stop which is connected to a door hinge and is intended for motor-vehicle doors in accordance with the pre-characterizing clause of Patent claim 1.

A door stop of this type which is connected to a door hinge is disclosed, in particular, in DE-A 196 19 473.3, where it is provided that with the use of a holding device, which is connected in a rotationally secure manner to the hinge half in which the hinge pin is rotatably mounted with a running fit, is designed as a track having an at least partially annular curvature and arranged concentrically with the axis of the hinge pin, and has depressions which are formed in the axial direction of the hinge pin and form latching marks, the braking and holding bodies are designed as rolling bodies which are accommodated rotatably on a bearing spindle aligned transversely to the hinge axis, and that the braking and holding bodies interact, by being stressed by a stressing spring supported against the free end of the hinge pin, with the latching marks which are designed as depressions in the end side of a protruding collar which is arranged at least partially annularly and concentrically with the axis of the hinge pin. This design of a door stop does indeed advantageously result in a relatively small design of a hinge door stop unit which requires little installation space in the radial direction and also has the advantage of a hinge door stop unit which can be produced very cost-effectively and nevertheless operates with little noise. However, it is associated with the shortcoming that the braking device and the holding device are arranged lying one above the other and aligned co-axially with the hinge pin and above the actual gudgeon. One result of such an arrangement is that the permissible diameter of the braking device and of the holding device is essentially determined by the pre-determined ratios of the diameter of the head roll of the hinge half on the one hand, and hinge pin, on the other hand, and also that the space required for accommodating the hinge door stop unit in the vehicle body has to be taken into account. Such restricted spatial design capability of the stop has the consequence that it is relatively difficult, on the one hand, to realize a relatively large number of latching or holding positions of the door in the first place and, secondly, at the same time also to still apply a sufficient braking and holding force. In particular, problems arise when there are a relatively large number of latching or holding positions of the door, for example when there are more than two latching or holding positions of the door, and not least in view of the possibly unfavourable tolerance pairings to be taken into account, to the effect that the predetermined braking and holding positions of the door cannot be kept to sufficiently exactly or be kept to with sufficient braking and stopping force.

A door stop which has been described at the beginning is also described in patent U.S. Pat. No. 5,346,272. In this, the braking and holding device is arranged on a driven spindle parallel to the hinge axis.

JP 09-303 032 and U.S. Pat. No. 5,867,872, which belongs to the same patent family, describe a door stop in which a mechanical braking and holding device for a door is extended onto a second spindle, parallel to the hinge axis This is intended to give a relatively large moment of friction with a low overall size. The gear mechanism of U.S. Pat. No. 5,867,872 does not contain any step-up.

SUMMARY OF THE INVENTION

The object of the invention, in a mechanical braking and holding device for a door stop, is to provide a step-up in such a manner that a multiplicity of latching and holding positions can be arranged for the door, and to improve a door stop, which is connected to a door hinge and is intended for motor-vehicles, to the effect that with the design being as small as possible and operation of the door stop being as noiseless as possible and irrespective, to the greatest possible extent, of possible deviations in tolerance, the door can be stopped exactly in a large number of latching and holding positions and the door is held with sufficient force in the respective latching and holding position, and also to provide, in a mechanical braking and holding device for the door stop, a step-up in such a manner that a multiplicity of latching and holding positions can be arranged for the door stop.

The arrangement of the present invention results firstly in the possibility of a small design of the braking and holding device of the hinge door stop unit with a multiplicity of latching and holding positions for the door stop. This results from the fact that the arrangement next to one another of the hinge pin and braking and holding device permits the placing of a step-up ratio between the rotational movement of the hinge pin and the rotational movement of the braking device or the holding device. As a consequence of such a step-up between the hinge pin and braking and holding device, it is then appropriate to form in the at least annular body forming the holding device a relatively large number of latching ramps even arranged, if appropriate, lying side by side, and thus to obtain a relatively large number of braking and holding positions of the door stop. Furthermore, the arrangement next to one another of the hinge pin and braking and holding device also affords the advantage of relatively great freedom for the arrangement for the braking and holding device and therefore in general a possibility of adapting, at least within a relatively large range, the particular spatial shape of the hinge door stop unit to the installation conditions designated on the vehicle body.

In a first and preferred embodiment, it is provided that a compression spring, which is designed as a helical spring, the braking-body carrier and the at least annular body, which forms the holding device, are arranged in a mutually concentric alignment lying one above another on a common spindle arranged in a fixed manner aligned parallel to the hinge axis and offset laterally with respect to the hinge pin. In this case, the arrangement is expediently brought about in such a manner that the braking-body carrier is supported non-rotatably and the at least annular body, which forms the holding device, is forcibly drive-connected to the hinge pin in such a manner that it is alternately driven in a rotating manner in the one or other direction as a function of the opening or closing movement of the door.

An arrangement which is to be preferred in the interests of, on the one hand, a small design and, on the other hand, of the possibility of a variable design of the spatial shape of the hinge door stop unit provides furthermore that the braking and holding device, which essentially comprises a compression spring, the braking-body carrier together with braking and holding bodies and the at least annular body, which forms the holding device, and a spindle which penetrates them, is accommodated as a whole in a recess, which is at least approximately of cup-shaped design, in the hinge half in which the hinge pin is mounted with a running fit. In this arrangement, the essentially cup-shaped recess is expediently formed by a blind hole, which is parallel to the gudgeon hole and overlaps the latter partially, at least tangentially, in the headroll, or in the region thereof, of the hinge half in which the hinge pin is mounted with a running fit.

In detail, it can then further be provided here that the body forming the holding device is formed by a disc having a circumferential toothing at least over part of its circumference. Via this circumferential toothing, the body is in meshing engagement with a circumferential toothing which is arranged complementary on the hinge pin or formed In this case, the circumferential toothing of the hinge pin which is in meshing engagement with the circumferentially toothed body forming the holding device is, if appropriate, also formed by a sleeve with a toothed ring, which is pressed onto the said hinge pin.

The braking-body carrier is advantageously supported in a rotationally secure manner on the hinge pin, specifically by means of a radially directed extension arm which is connected to the said hinge pin, in which case, a simple design is for the extension arm of the braking-body carrier to be provided with a hole-type recess and to have the hinge pin passing through it.

In conjunction with this extension arm arrangement, the possibility is then also opened up of the braking-body carrier being acted upon by two compression springs which are in mutually parallel alignment, are arranged next to each other and are formed by helical springs, in such a manner that one of the two compression springs is arranged aligned co-axially with the hinge pin and acts on the extension arm of the braking-body carrier.

The blind hole which accommodates the braking and holding device and overlaps the gudgeon hole partially, preferably tangentially, preferably opens into the outer end joint surface of the hinge half in which the hinge pin is mounted with a running fit. It is closed off from the outside by a closure plate in such a manner that the closure plate simultaneously forms a support for the spindle passing through the braking and holding device and also for the helical spring acting upon the braking-body carrier. The closure plate for the blind hole accommodating the braking and holding device is expediently designed in such a manner that it also closes the gudgeon hole, the hinge pin being supported against the outside of the closure plate by means of a holding or securing disc.

In a second embodiment, which is suitable for applying relatively high braking and holding forces, starting from a hinge door stop unit primarily designed in accordance with the features presented above, it is furthermore provided that a braking and holding device, which comprises a compression spring designed as a helical spring, a braking-body carrier and an at least annular body, which forms the holding device, and also a spindle, which passes through the said holding device, and which braking and holding device is arranged laterally offset with respect to the said hinge axis in a parallel alignment to the hinge axis on the hinge half in which the hinge pin is mounted with a running fit, is assigned an electromagnetic brake which is connected in a rotationally secure manner to the at least annular body, which, for its part, is drive-connected by meshing to the hinge pin and forms the holding device In a further refinement, it can then also be provided here the electromagnetic brake is connected in a rotationally secure manner to the spindle passing through the braking and holding device, and the spindle for its part is connected by means of a toothed engagement in a rotationally secure manner to the at least annular body forming the holding device.

The electromagnetic brake is expediently accommodated for its part in its own housing which, for its part, is fastened in a rotationally secure manner on the outside of a closure plate which accommodates the braking and holding device and partially overlaps the gudgeon hole, and which closes the blind hole which opens into the outer end joint surface of the hinge half in which the hinge pin is mounted with a running fit.

SUMMARY OF THE INVENTION

The invention is described in detail in the following description with reference to exemplary embodiments of the preferred embodiment which are illustrated in the drawing, in which FIG. 1 shows a longitudinal section through a first embodiment of a hinge door stop unit for motor-vehicle doors;

DETAILED DESCRIPTION

Figure 1:
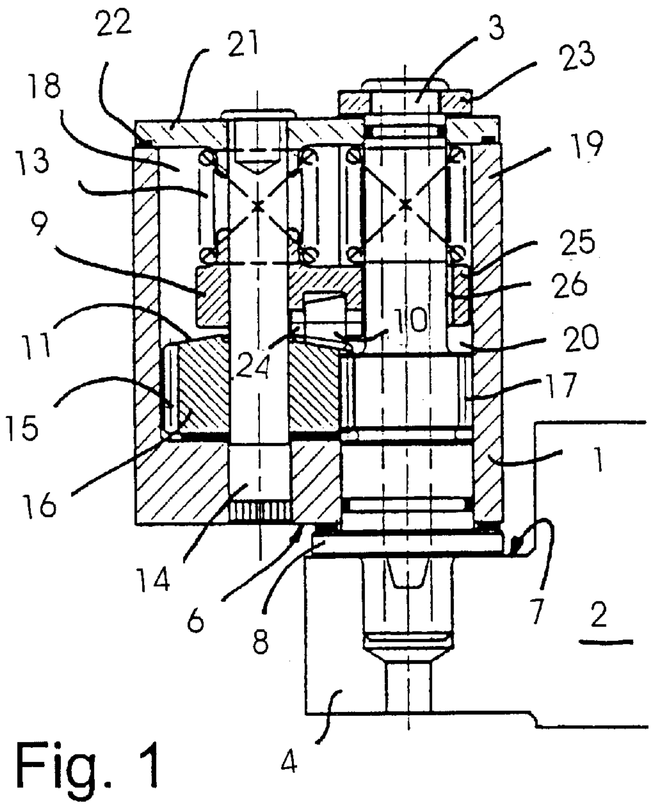

The door hinge comprises a first hinge half 1, which acts upon one of the two door assembly parts (not shown in the drawing), and a second hinge half 2, which acts upon the other door assembly part, and also a hinge pin 3 connecting the two hinge halves 1 and 2 pivotably to each other. The hinge pin 3 is mounted with a running fit in the first hinge half 1 in a freely rotatable manner. In the other hinge half 2, when the hinge is assembled, the hinge pin 3, is held in a rotationally secure manner in the gudgeon 4, the hinge pin 3 having a radially protruding collar 8 which engages between the mutually facing end joint surfaces 6 and 7 of the two hinge halves 1 and 2.

The door stop structurally combined with the door hinge is admittedly aligned parallel to the axis of the latter, but is laterally offset with respect to the hinge pin 3. The said door stop comprises a braking device and a holding device, the braking device having a braking-body carrier 9 and a number of braking and holding bodies 10 which are held rotatably in the latter and are designed as rotational bodies. In this arrangement, the holding device is formed by a disc-shaped body 16 which is provided on its surface 11 facing the braking-body carrier 9 with a multiplicity of braking ramps formed by depressions 12 aligned such that they run radially Furthermore, a helical spring 13 is assigned in this case to the stressing of the braking-body carrier 9 in the axial direction. In this arrangement, the braking and holding device are passed through by a spindle 14 which is arranged in parallel alignment with the hinge pin 3. The door stop is drive-connected to the hinge pin 3 by means of a circumferential toothing 15 of the disc-shaped body 16 forming its holding device, via which toothing it is in positive-locking, meshing engagement with a toothed ring 17 arranged on the hinge pin 3, in such a manner that the disc-shaped body 16, which forms the holding device, is driven in a rotating manner forcibly in one or the other direction as a function of the door movement. In all of the embodiments shown in the exemplary embodiment, the diameters of the body 16 and toothed ring 17 are selected in such a manner that a step-up ratio of 1:1.5 is produced in the transmission of the drive. All of the embodiments illustrated in the exemplary embodiments also share the common feature of the door stop being accommodated as a whole in a blind hole 18 in the region of the head roll 19 of the hinge half 1, in which case the blind hole 18 overlaps the gudgeon hole of the hinge half 1 tangentially so as to make possible a mutual, meshing engagement of the toothing of the body 16 with the toothed ring 17 of the hinge pin 3. It is furthermore provided in all of the embodiments that the blind hole 18 opens into the outer end joint surface of the hinge half 1 and is closed by means of a closure plate 21. In this arrangement, the closure plate 21 fits over the blind hole 18 and the gudgeon hole and is fastened on the hinge half 1 by means of a moulded-on seal 22. The closure plate 21 simultaneously forms the support for the hinge pin 3, which is connected non-moveably in the axial direction to the hinge half 1 via a securing disc 23 resting on the outer surface of the closure plate 21. Furthermore, the closure plate 21 also serves for supporting the spindle 14 as the door stop in the radial direction.

Figure 2:
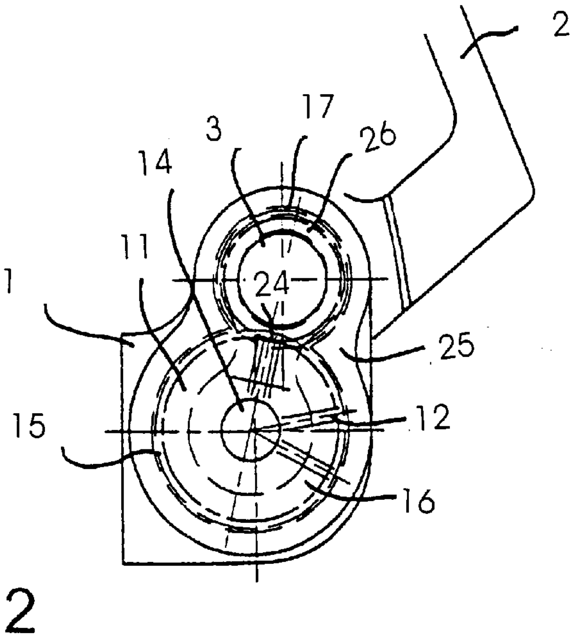
FIG. 2 shows a section through the door stop according to FIG. 1 along the line II—II

Over and beyond these design features shared by all of the embodiments, the embodiment according to FIGS. 1 and 2 is distinguished in a particular manner in that the braking and holding bodies 10 are formed by tapered rollers and are accommodated in the braking-body carrier 9 in a manner such that they can rotate about axes 24 aligned radially with respect to the spindle 14. Furthermore, in the embodiment illustrated in FIGS. 1 and 2, as in the embodiment illustrated in FIGS. 3 and 4, the braking-body carrier 9 is supported against the hinge pin 3 in a rotationally secure manner via a radial extension arm by the extension arm being provided with a hole-type recess 26 through which the hinge pin 3 passes. Likewise, both in the embodiment according to FIGS. 1 and 2 and in the embodiment according to FIGS. 3 and 4, there is a second compression spring 27 which is designed as a helical spring, is arranged concentrically with the hinge pin 3 and is supported at one end against the closure plate 21 and at the other end, by means of the extension arm 25, on the braking-body carrier parallel to the helical spring 13 in order to increase the pressure to which the braking and holding bodies 10 are subjected. As can furthermore be seen in particular from the section illustrated in FIG. 2, between a, first latching ramp, which marks the zero position arranged approximately at an opening angle of the door of 200, and a second latching ramp, which marks the opening position of the door, the surface 11 of the body 16 may have, for example one, but if required also more than one, further latching ramp 28 forming an intermediate latch in each case.

Figure 3:
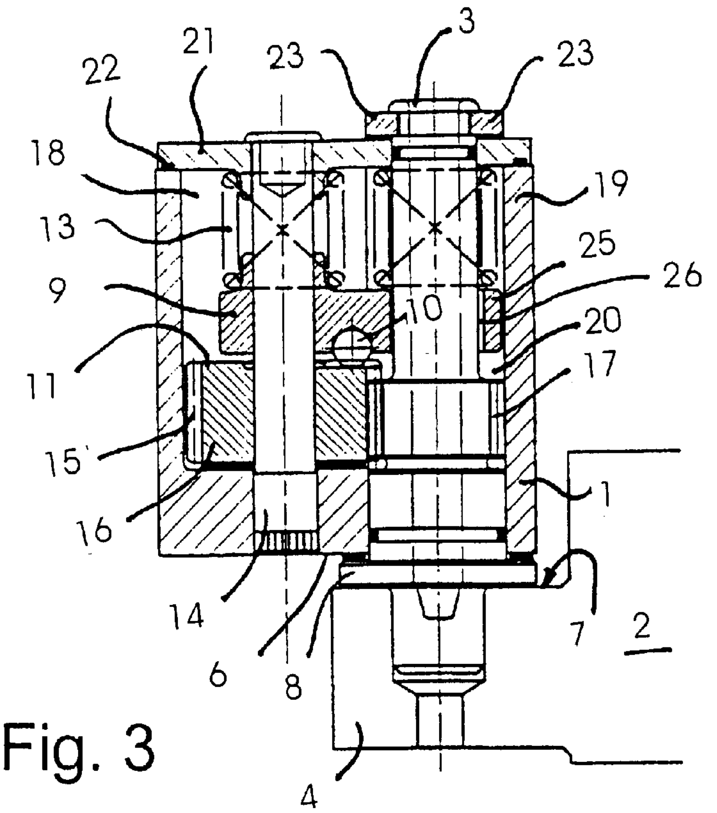
FIG. 3 shows a longitudinal section through a second embodiment of a hinge door stop unit for motor-vehicle doors.
Figure 4:
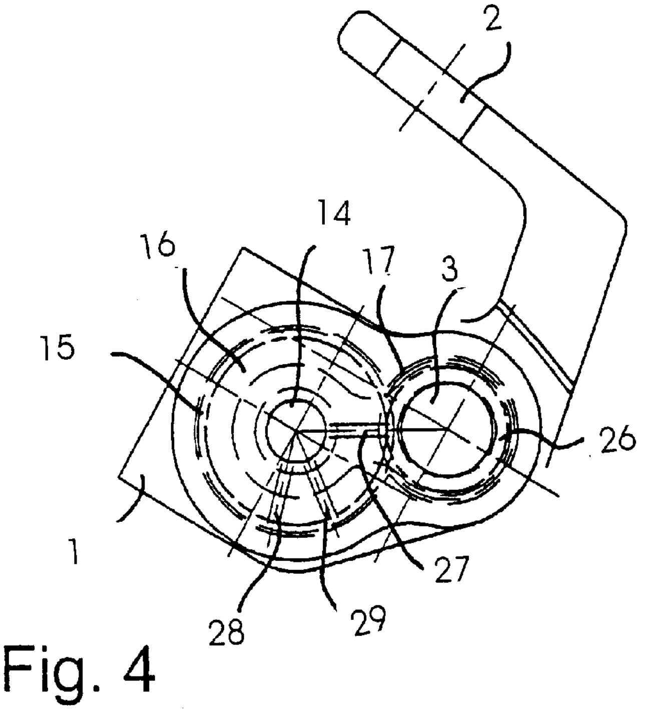
FIG. 4 shows a section through the door stop according to FIG. 3 along the line IV—IV.

The embodiment illustrated in FIGS. 3 and 4 differs from the embodiment illustrated in FIGS. 1 and 2 in particular by the fact that the braking and holding bodies 10 mounted in the braking-body carrier 9 are formed by latching balls.

Figure 5:
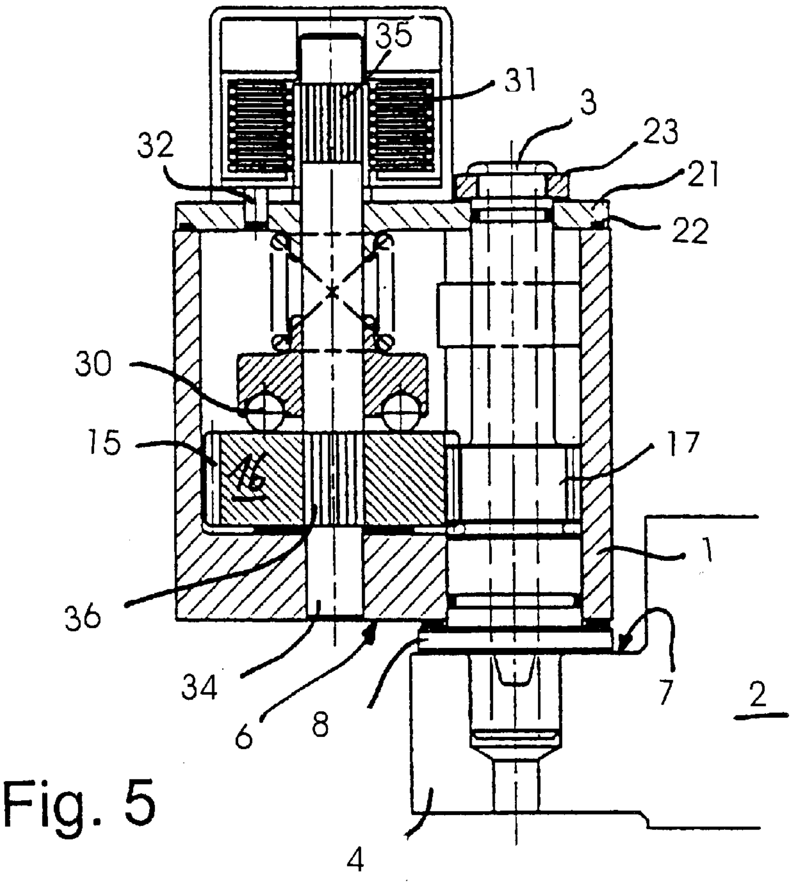
FIG. 5 shows a longitudinal section through a further embodiment of a hinge door stop unit for motor-vehicle doors.
Figure 6:
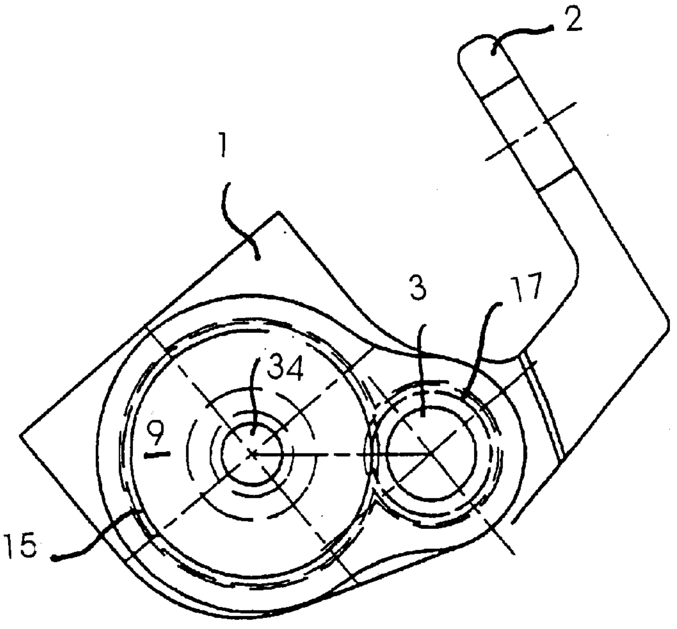
FIG. 6 shows a section through the door stop according to FIG. 5 along the line VI—VI.

In the embodiment illustrated in FIGS. 5 and 6, an electromagnetic brake 31 is provided in addition to a braking device formed by a braking-body, carrier 9 provided with latching balls mounted in it, and to a holding device formed by a disc-shaped body 16 arranged concentrically with the said carrier, and also in addition to a compression spring which is supported against the closure plate 21, acts on the braking-body carrier 9 and is formed by a helical spring 13. The electromagnetic brake 31 is accommodated in a housing 33, which is supported in a rotationally secure manner against the closure plate 21 via a journal 32, and is connected in a rotationally secure manner via a toothing engagement 35 to a spindle 34, the spindle 34 being in rotationally secure engagement at the other end, via a further toothing engagement 36, with the body 16 which, for its part, is in positive-locking, meshing engagement, by means of a circumferential toothing 15, with the toothed ring 17 arranged on the hinged pin 3 in such a manner that during an opening and closing movement of the door the body 16 is forcibly rotatingly driven in one or other direction. In the reverse direction, the rotatability of the hinge can be blocked via the positive-locking, meshing coupling of the body 16 to the hinge pin 3, on the one hand, and the rotationally secure connection of the body 16 to the electromagnetic brake 31, on the other hand, when the electromagnetic brake 31 is activated. In order to switch on the electromagnetic brake 31, sensors which are not illustrated in the drawing can be used and these can, for example, convert opening positions of the door which are to be closed into electrical signals.

List of reference numbers

| | |
|---|---|
| 1 | Hinge half with a running fit |
| 2 | Hinge half rotationally secure in the gudgeon |
| 3 | Hinge pin |
| 4 | Gudgeon |
| 6 | End joint surface |
| 7 | End joint surface |
| 8 | Collar of the hinge pin, radially protruding and engaging between the end joint surface 6 and end joint surface 7 |
| 9 | Braking-body carrier |
| 10 | Braking and holding bodies |
| 11 | Surface of the body 16 |
| 12 | Depression |
| 13 | Helical spring |
| 14 | Spindle |
| 15 | Toothing |
| 16 | Body, disc-shaped (forms the holding device) |
| 17 | Toothed ring with hinge pin 3 |
| 18 | Blind hole |
| 19 | Headroll |
| 20 | Gudgeon hole |
| 21 | Closure plate |
| 22 | Seal, moulded on |
| 23 | Securing disc |
| 24 | Axis, radial to the spindle 14 |
| 25 | Radial extension arm |
| 26 | Hole-type recess |
| 27 | Second compression spring, designed as a helical spring |
| 28 | Latching ramp |
| 29 | Latching ramp |
| 30 | Latching ball |
| 31 | Brake, for example electromagnetic |
| 32 | Journal |
| 33 | Housing |
| 34 | Spindle |
| 35 | Toothing engagement |
| 36 | Toothing engagement |

What is claimed is:

1. A door stop connected to a door hinge and intended for motor-vehicle doors, comprising:

a holding device connected to a first hinge half assigned to one of a door or a door pillar; and a braking device connected to a second hinge half assigned to an other of the door or the door pillar, the first and second hinge halves being connected pivotably to each other by a hinge pin arranged concentrically with a hinge axis, the braking device having at least two braking and holding bodies which are subjected to a spring load, the holding device having at least one latching ramp which is assigned to the braking and holding bodies, the braking and holding bodies being accommodated in a pre-determined, aligned position in a braking-body carrier and being stressed in a direction of the latching ramp at least using one compression spring, the holding device, which has the at least one latching ramp, being formed by at least one annular body arranged concentrically with the braking-body carrier, one of the holding device and braking device being driven in a rotating manner as a function of a door movement so as to define a driven device, the braking device and the holding device being arranged in a parallel alignment, offset laterally with respect to the hinge axis, on one of the first or second hinge halves in which the hinge pin is mounted with a running fit, and in that a drive of the braking device and the holding device contains a step-up of the rotational speed with respect to the hinge itself, and the braking-body carrier is supported non-rotatably, the at least one annular body being forcibly drive-connected to the hinge pin in such a manner that the annular body is alternately driven in a rotating manner in one or an opposite direction as a function of an opening or closing movement of the door, the annular body being formed by a disc having a circumferential toothing at least over part of a circumference of the annular body, and via the circumferential toothing is in meshing engagement with a second circumferential toothing of complementary design on the hinge pin.

2. The door stop according to claim 1 wherein the compression spring, which is designed as a helical spring, the braking-body carrier and the at least one annular body are arranged in a mutually concentric alignment lying one above another on a common spindle arranged in a fixed manner aligned parallel to the hinge axis and offset laterally with respect to the hinge pin.

3. The door stop according to claim 1 further comprising a spindle penetrating the compression spring, the braking-body carrier, the braking and holding bodies and the at least one annular body, which together define a braking and holding device which is accommodated as a whole in a recess of at least approximately of cup-shaped design in the one of the first and second hinge halves in which the hinge pin is mounted with a running fit.

4. The door stop according to claim 1 wherein the hinge half in which the hinge pin is mounted with a running fit has an essentially cup-shaped recess formed by a blind hole, which is parallel to a gudgeon hole and partially overlapping the gudgeon hole, at least tangentially, in a headroll region of the hinge half in which the hinge pin is mounted with a running fit.

5. The door stop according to claim 1 wherein the second circumferential toothing is formed by a sleeve with a toothed ring, which is pressed onto the hinge pin.

6. The door stop according to claim 1 wherein the braking-body carrier is supported on the hinge pin in a rotationally secure manner using a radially directed extension arm.

7. The door stop according to claim 1 wherein the braking body carrier has a radially directed extension arm provided with a hole-type recess and has the hinge pin passing through the recess.

8. The door stop according to claim 1 wherein the braking-body carrier is acted upon by the compression spring and another compression spring which are in mutually parallel alignment, are arranged next to each other and are formed by helical springs, one of the compressions spring and the other compression spring being arranged aligned co-axially with the hinge pin and acting on an extension arm of the braking-body carrier.

9. The door stop according to claims 1 wherein a blind hole which accommodates the braking and holding device and overlaps a gudgeon hole partially, at least tangentially, opens into an outer end joint surface of the hinge half in which the hinge pin is mounted with a running fit, and is closed by a closure plate which simultaneously forms a support for a spindle passing through the braking and holding device and also for the compression spring acting upon the braking-body carrier.

10. The door stop according to claim 1 wherein a blind hole, which accommodates the braking and holding device, and a gudgeon hole are closed by a common closure plate, the hinge pin being supported against an outside of the closure plate by a holding or securing disc.

11. A door stop connected to a door hinge and intended for motor-vehicle doors, comprising:

a holding device, which is connected to a first hinge half assigned to one of a door and a door pillar; and a braking device which is connected to a second hinge half assigned to the other of the door and the door pillar, the braking device having at least two braking and holding bodies which are subjected to a spring load, and the holding device has at least one latching ramp which is assigned to the braking and holding bodies, the braking and holding bodies being accommodated in a predetermined, aligned position in a braking-body carrier and being stressed in the direction of the latching ramp in the holding device at least by one compression spring, the holding device being formed by at least one annular body arranged concentrically with the braking-body carrier, and one of the holding device and the braking device being driven in a rotating manner as a function of a door movement, the compression spring, which is designed as a helical spring, the braking-body carrier, the at least one annular body and a spindle passing therethrough defining a braking and holding device, the braking and holding device being arranged laterally offset with respect to the hinge axis in a parallel alignment on one of the first and second hinge halves in which the hinge pin is mounted with a running fit, the braking and holding device being assigned an electromagnetic brake which is connected in a rotationally secure manner to the at least one annular body, which is drive-connected by meshing to the hinge pin.

12. The door stop according to claim 11 wherein the electromagnetic brake is connected in a rotationally secure manner to the spindle passing through the braking and holding device, and the spindle is connected by a toothed engagement in a rotationally secure manner to the annular body.

13. The door stop according to claim 11 wherein the electromagnetic brake is accommodated in a housing which is fastened in a rotationally secure manner on an outside of a gudgeon hole and which closes a blind hole which opens into an outer end joint surface of the hinge half in which the hinge pin is mounted with a running fit.

* * * * *